(12) United States Patent
Amamori

(10) Patent No.: US 6,296,270 B1
(45) Date of Patent: Oct. 2, 2001

(54) AIRBAG DEVICE WITH LID CONNECTION MECHANISM

(75) Inventor: Ichiro Amamori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/665,310

(22) Filed: Sep. 19, 2000

(30) Foreign Application Priority Data

Oct. 1, 1999 (JP) .................................................. 11-281682

(51) Int. Cl.$^7$ .................................................. B60R 21/16
(52) U.S. Cl. .................................. 280/728.2; 280/728.3
(58) Field of Search .............................. 280/728.2, 728.3, 280/732

(56) References Cited

U.S. PATENT DOCUMENTS

| | | | |
|---|---|---|---|
| 5,342,090 | * | 8/1994 | Sobczak et al. . |
| 5,588,669 | * | 12/1996 | Leonard et al. . |
| 5,851,023 | * | 12/1998 | Nagata et al. . |
| 5,887,891 | * | 3/1999 | Taguchi et al. . |
| 6,010,146 | * | 1/2000 | Otsuka et al. . |

* cited by examiner

*Primary Examiner*—Paul N. Dickson
(74) *Attorney, Agent, or Firm*—Kanesaka & Takeuchi

(57) ABSTRACT

A passenger's side airbag device of the invention is formed of a case, an airbag, a lid, attachment members for connecting the lid to the case, and an inflator. In order to attach the lid to the case, leg portions are inserted into insertion openings of the attachment members and pressed downwardly. The leg portions hit outer projecting pieces at first, and move downwardly while being slightly bent inwardly. Then, the leg portions hit inner projecting pieces and move while being slightly bent outwardly. When the inner projecting pieces face first openings and the outer projecting pieces face second openings, the projecting pieces enter the openings, so that the lid is attached to the case. It is easy to attach the lid to the case.

8 Claims, 5 Drawing Sheets

AIRBAG DEVICE WITH LID CONNECTION MECHANISM

BACKGROUND OF THE INVENTION AND RELATED ART STATEMENT

The present invention relates to an airbag device which is suitable for a passenger seat of an automobile, and especially, the present invention relates to an airbag device in which a connection structure between a lid and a case is improved.

In a passenger's seat airbag device, a folded airbag is accommodated in a case, that is also called as a container or retainer, and a rim portion of a gas receiving hole of the airbag is attached to the case.

A front surface of the case is opened, and this opening is covered by a lid. The lid is disposed on a substantially same plane as an instrument panel. When an inflator disposed in the case is actuated to generate a gas, the airbag presses a reverse side of the lid to open the lid, and the airbag is deployed in an interior of the vehicle.

Incidentally, leg portions project downwardly from the reverse surface of the lid, and the leg portions are attached to the case by rivets or bolts in most cases. A tear line may be provided in the lid in order to open the lid in case of deploying the airbag, so that the lid is torn to open along the tear line. Also, the lid may be opened by separating the leg portions from the case. The lid may be opened by tearing the leg portions.

Further, in many cases, hook fittings are welded to the case, and hook portions of the hook fittings are inserted into openings in the leg portions.

FIG. 3 shows a sectional view showing a conventional airbag device in which the hook fittings are applied. An airbag device 1 is formed of an inflator 2 for generating a gas in the event of a vehicle collision; a case 3 for accommodating the inflator; an airbag 5 accommodated inside the case 3 in a folded condition; and a lid 6 for closing an opening at an upper portion of the case 3. Reference numeral 9 designates an instrument panel.

On an outer surface of the upper portion of the case 3, hook fittings 10 and 11 are fixed by spot welding. The hook fittings 10 and 11 extend along an upper rim of the case 3, and a plurality of hook portions 12 in a claw shape is integrally formed with an adequate interval therebetween in a direction of extending the hook fittings 10 and 11. In leg portions 7 of the lid 6, there are formed openings 13 which correspond to the hook portions 12 and engage the hook portions 12. On an inner surface of the lid 6, a thin-walled portion 8 is formed.

In order to attach the lid 6 to the case 3 for assembling the airbag device 1, the lid 6 is pushed inwardly to cover the opening at the upper surface of the case 3. As a result, the leg portions 7 of the lid 6 are deformed elastically outwardly and passes over the hook portions 12, and when the hook portions 12 and the openings 13 are aligned, the leg portions 7 are returned to the original shapes, so that the hook portions 12 are inserted into the openings 13.

In the airbag device structured as described above, when the inflator 2 is actuated, the airbag 5 is inflated, and the lid 6 is torn to open along the thin-walled portion 8, so that the airbag 5 is deployed in the interior of the vehicle.

As a conventional structure of attaching the leg portions of the lid to the case, Japanese Patent Publication (KOKAI) No. H9-277897 discloses a structure in which projections are provided on an inner surface of a rim of the case in order to engage the openings in the leg portions with the projections, and the leg portions are pressed against the inner surface of the case by end portions of fittings inside the case called diffusers.

In case the leg portions 7 are engaged with the hook portions 12 of the hook fittings 10 and 11 as shown in FIG. 3, it is necessary to bend the leg portions 7 largely outwardly. Thus, in the assembling step of attaching the lid 6 to the case 3, it is necessary to press the lid 6 against the case 3 strongly, resulting in a disadvantage in the assembling.

Also, in the structure disclosed in Japanese Patent Publication (KOKAI) No. H9-277897, it is necessary to extend the end portions of the diffusers up to the vicinity of the rim of the front surface of the case. As a result, the device becomes considerably heavy.

Accordingly, an object of the invention is to provide an airbag device which is easy to assemble and has a lid attaching member with a light weight.

Further objects and advantages of the invention will be apparent from the following description of the invention.

SUMMARY OF THE INVENTION

To achieve the aforementioned object, the present invention provides an airbag device which comprises: a case having an opening for allowing an airbag to pass therethrough in case of inflation of the airbag; an inflator attached to the case for generating a gas; the airbag accommodated in the case; a lid for covering the opening of the case; and a leg portion projecting from a rear surface of the lid for fixing the lid. In the airbag device of the invention, attaching members, which include inner projecting pieces disposed at an inside of the leg portion and outer projecting pieces disposed at an outside of the leg portion, are fixed to a rim portion of the opening of the case, and the leg portions are provided with first openings, into which the inner projecting pieces are inserted and engaged, and second openings, into which the outer projecting pieces are inserted and engaged.

In case of assembling the airbag device described above, when the leg portions of the lid are inserted between the inner projecting pieces and the outer projecting pieces, the inner projecting pieces are engaged with the first openings of the leg portions, and the outer projecting pieces are engaged with the second openings. Since the leg portions are engaged with and stopped by the projecting pieces from both the inside and the outside thereof, even if the engagements between the projecting pieces and the openings are loose, the projecting pieces and the openings are not disengaged. Therefore, it is not necessary to bend the leg portions significantly largely in case the leg portions of the lid are engaged with the attaching members, so that the attachment of the lid is simple. Also, the attaching member has a light weight.

In the airbag device structured as described above, preferably, the attaching member includes a main plate portion disposed on and fixed to the rim portion of the case, a protruding portion bent from the main plate portion toward an outside of the case, and a pendent portion bent from the protruding portion toward a bottom or rear side of the case, and the protruding portion is provided with an insertion hole for the leg portion. Also, it is preferable that the inner projecting pieces are formed in the main plate portion, and the outer projecting pieces are formed in the pendent portion, wherein the inner projecting pieces and the outer projecting pieces are respectively inclined toward the rear side. In this case, the leg portion is inserted into the insertion hole and guided therein to engage the openings and the projecting pieces. The leg portion hits the projecting pieces in the direction of the inclinations of the projecting pieces, so that the leg portion can be inserted smoothly inside the insertion hole. Also, after the projecting pieces and the openings are engaged, the projecting pieces can be surely prevented from disengaging from the openings.

Furthermore, the present invention provides an airbag device, comprising: a case including an opening for allowing an airbag to pass therethrough in case of deploying the airbag; an inflator attached to the case for generating a gas; the airbag accommodated in the case; a lid for covering the opening of the case; and a leg portion projecting from a rear surface of the lid for fixing the lid. In this airbag device, an inner plate portion, which is disposed at an inside of the leg portion, and an outer plate portion, which is disposed at an outside of the leg portion, are formed integrally with the case at a rim portion of the opening of the case, and the inner plate portion is provided with inner projections projecting toward the outer plate portion. Also, the outer plate portion is provided with outer projections projecting toward the inner plate portion. The leg portion is provided with first openings, with which the inner projections are engaged, and second openings, with which the outer projections are engaged.

In case of assembling the airbag device described above, when the leg portion of the lid is inserted into a space between the inner projections and the outer projections, the inner projections engage the first opening of the leg portion, and the outer projection engage the second openings. Since the leg portion is engaged with and stopped by the projections from both the inside and the outside thereof, even if the engagements between the projections and the openings are loose, the projections and the openings are not disengaged.

In the airbag device described above, preferably, the case including the inner plate portion and the outer plate portion is integrally formed of a synthetic resin or a light metal, and the inner plate portion and outer plate portion are respectively provided with U-shaped slits to form elastic tongue pieces. Furthermore, it is preferable that the respective projections are formed at the respective elastic tongue pieces, and the inner projections and the outer projections are respectively inclined toward a rear side.

In this case, the leg portion is inserted into the insertion hole to be guided therein to engage the openings and the projections, and the leg portion hits the projections in the inclination direction of the projections, so that the leg portion can be inserted smoothly inside the insertion hole. Also, after the projections and the openings are engaged, the projections can be surely prevented from disengaging from the openings.

DETAILED DESCRIPTION OF PREFERRED EMBODIMENTS

Figure 1:
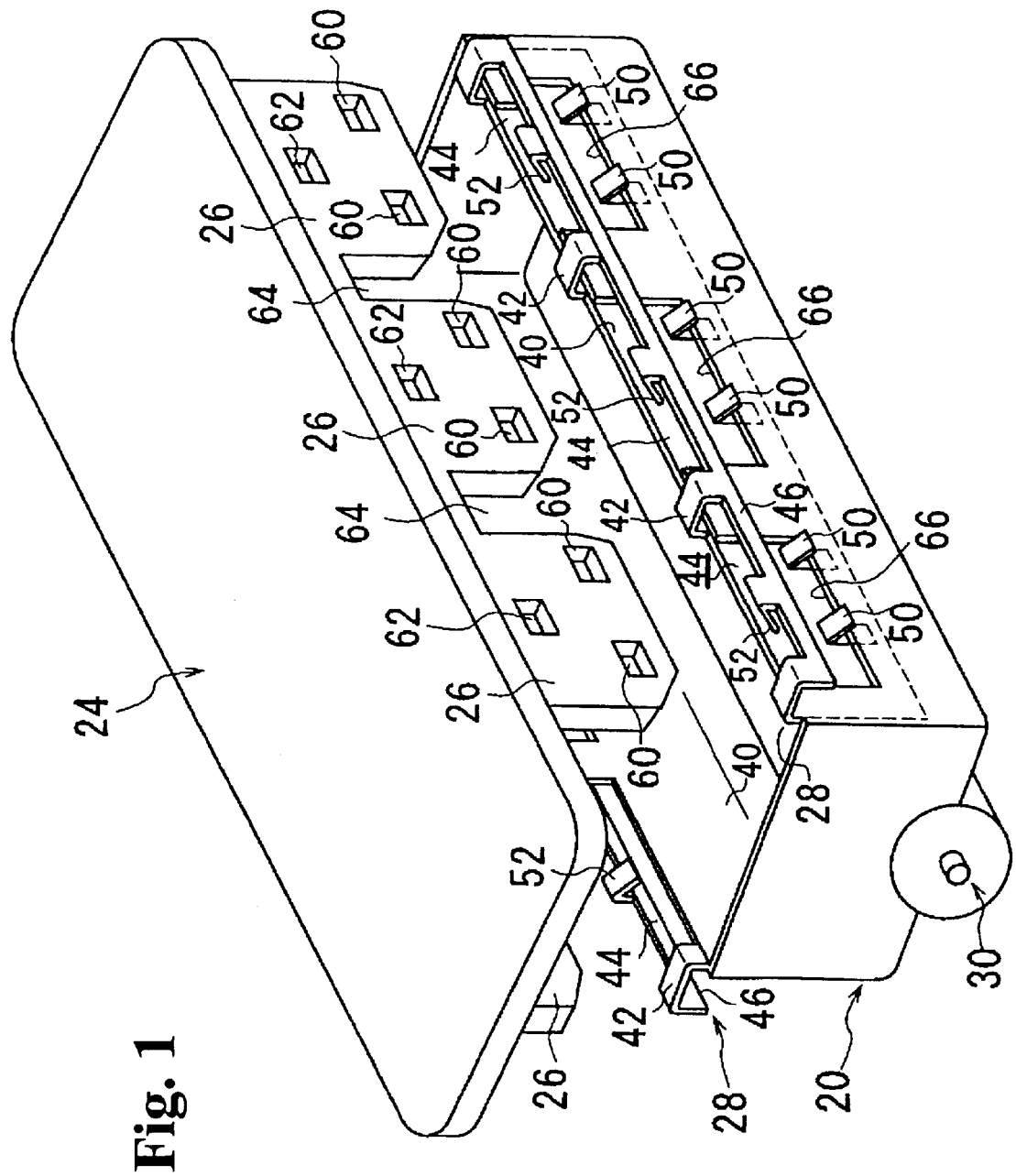
FIG. 1 is a perspective view showing a case and a lid of an airbag device according to an embodiment of the invention.
Figure 2:
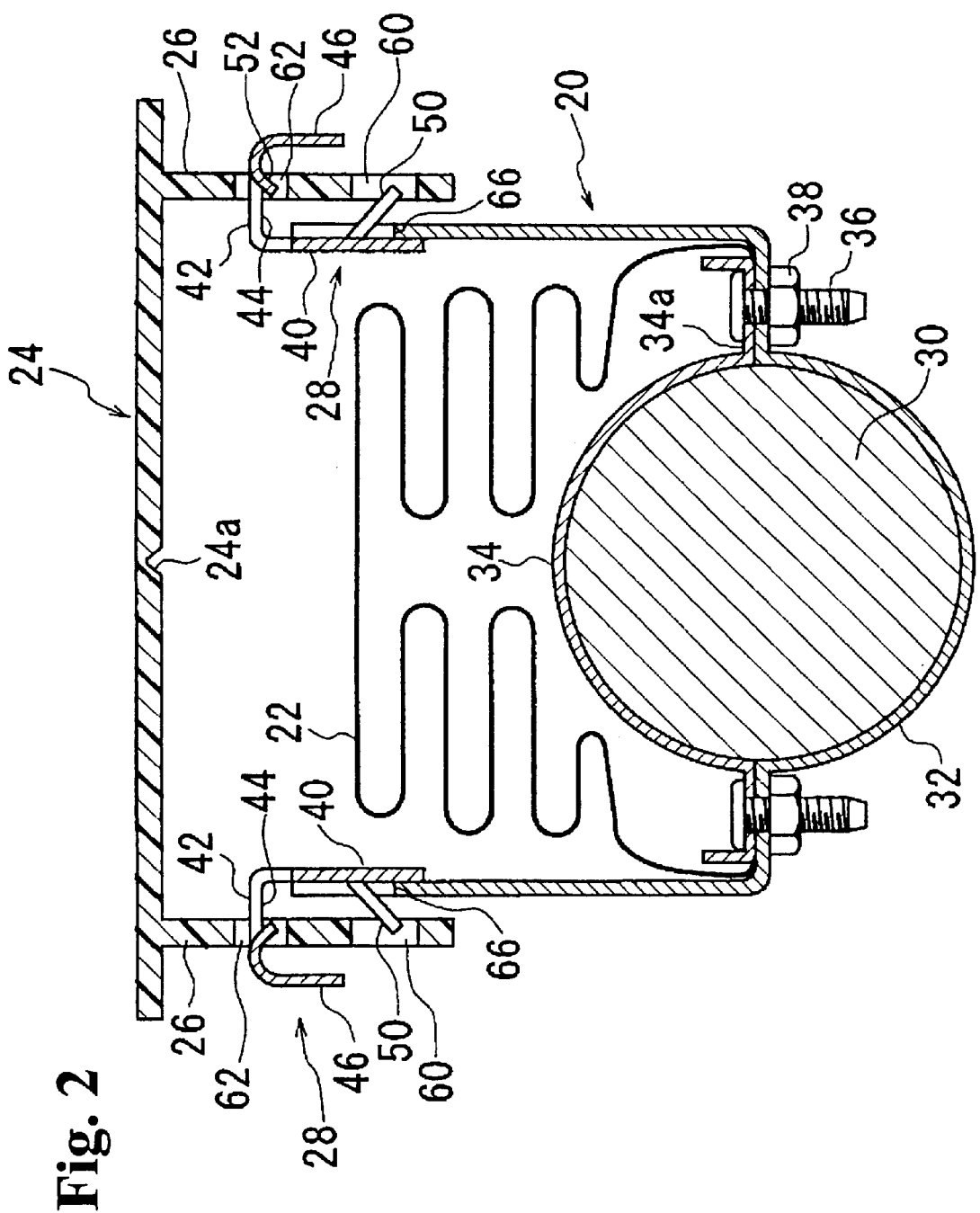
FIG. 2 is a sectional view of the airbag device shown in FIG. 1.
Figure 3:
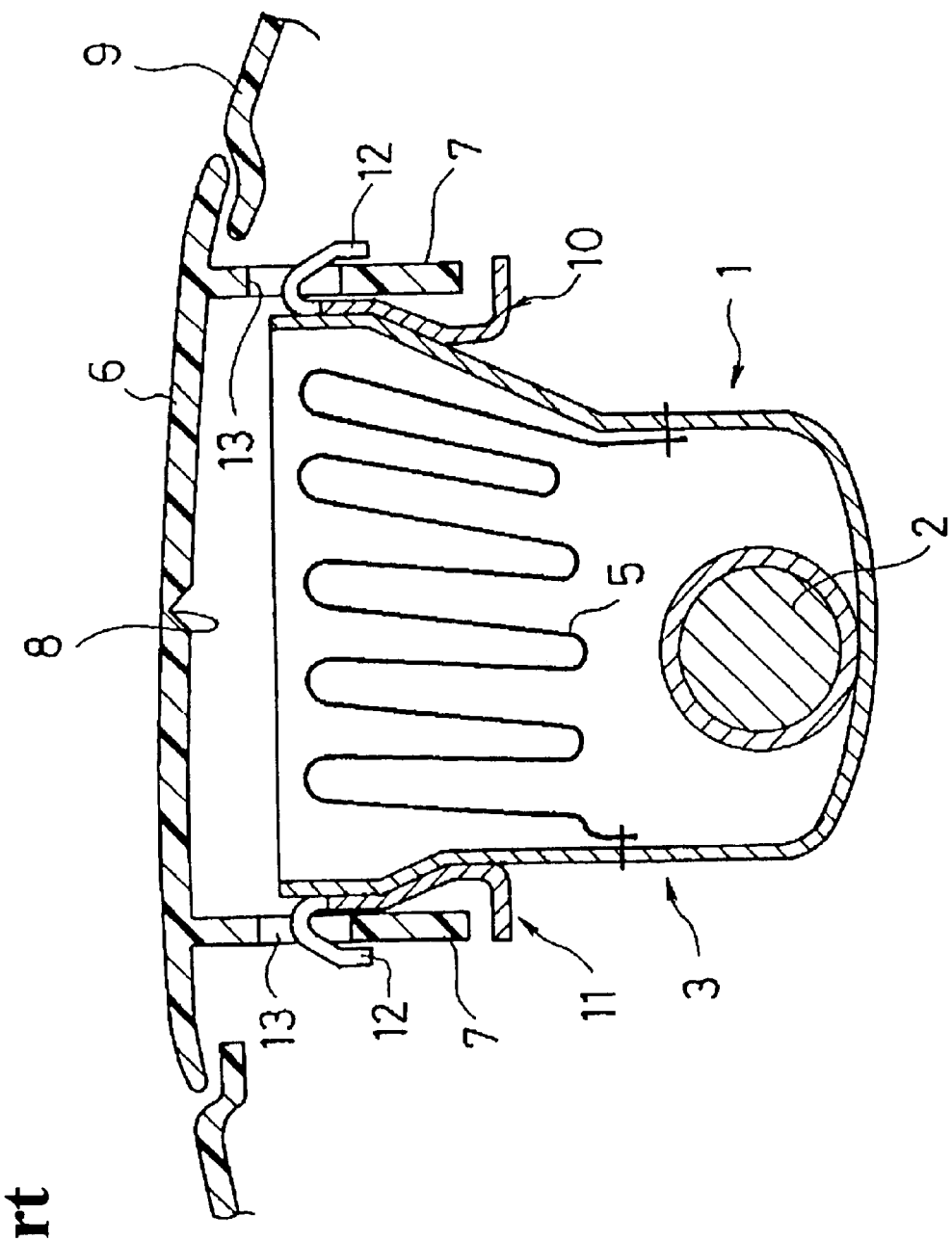
FIG. 3 is a sectional view of a conventional airbag device.

Hereunder, embodiments of the invention will be explained with reference to the attached drawings. FIG. 1 is a perspective view of a lid and a case of an airbag device according to an embodiment of the invention, and FIG. 2 is a sectional view of the airbag shown in FIG. 1.

A passenger's seat airbag device according to the embodiment of the invention includes a case 20 having a substantially rectangular shape in a plan view; an airbag 22 (not shown in FIG. 1) folded and disposed inside the case 20; a lid 24 for covering an opening at an upper surface side of the case 20; attaching members 28 for connecting leg portions 26 of the lid 24 to the case 20; and an inflator 30 having an approximately cylindrical shape for generating a gas for inflating the airbag 22.

The attaching members 28 are fixed to the case 20 by spot welding. The case 20 and the attaching members 28 are respectively made of metal, such as plated steel sheet. In case the attaching member 28 is formed of the same kind of a steel material as that of the case 20, it is sufficient that a thickness of the attaching member 28 is 1.2 to 1.8 times thicker than that of the case 20.

In a bottom of the case 20, a swelling or enlarged portion 32 in a semicircular arc shape is projected. The inflator 32 is engaged with the swelling portion 32, and a holding member 34 covers the inflator 30 from the upper side. The holding member 34 includes flanges 34a which are disposed on the bottom surface of the case 20, and a rim portion of a gas introducing port of the airbag 22 is sandwiched between the flange 34a and the bottom surface of the case 20. The flanges 34a are fixed to the case 20 by bolts 26 and nuts 38.

The attaching members 28 extend along upper rims of the case 20 in a longitudinal direction. Main plate portions 40 of the attaching members 28 are disposed inside the case 20, and fixed to the case 20 by spot welding.

From the upper side of the attaching member 28, protruding portions 42 are provided to extend outwardly. The protruding portions 42 are provided with insertion openings 44 for the leg portions 26. From distal ends of the protruding portions 42, a pendent portion 46 is provided to extend toward a rear side of the case, that is, toward a lower side in the figure.

In the main plate portion 40, inner projecting pieces 50 are formed by cutting and raising outwardly. Outer projecting pieces 52 are projected from the pendent portion 46. The inner projecting pieces 50 and the outer projecting pieces 52 respectively have shapes of tongues inclined toward the rear side of the case 20, that is, the lower side in the figure.

In the leg portions 26, there are formed first openings 60 with which the inner projecting pieces 50 are engaged, and second openings 62 with which the outer projecting pieces 52 are engaged. Incidentally, in the leg portions 26, notches 64 are formed upwardly from the lower side of the leg portions 26. Also, cut-out portions 66 are formed at the upper rim of the case 20, and the main plate portions 40 are disposed to close the cut-out portions 66. The inner projecting pieces 50 pass through the cut-out portions 66 and project outside of the case 20.

In case the airbag device is assembled, in order to attach the lid 24 to the case 20, it is only required to insert the leg portions 26 into the insertion openings 44 and press the leg portions 26 downwardly. The leg portions 26 are guided by the insertion openings 44 to move downwardly. In this case, the leg portions 26 hit the outer projecting pieces 52 at first, and move downwardly while being slightly bent inwardly. Then, the leg portions 26 hit the inner projecting pieces 50, and move while being slightly bent outwardly. When the inner projecting pieces 50 face the first openings 60 and the outer projecting pieces 52 face the second openings 62, the projecting pieces 50 and 52 enter the openings 60 and 62, respectively, so that the lid 24 is attached to the case 20. The attachment of the lid 24 is carried out very smoothly, and a weak force is sufficient for pushing the leg portions 26. Also, since the leg portions 26 are guided into the insertion openings 44, positioning of the projecting pieces 50 and 52 to the openings 60 and 62 is carried out naturally, and the projecting pieces 50 and 52 are easily engaged with the openings 60 and 62. Furthermore, since the projecting pieces 50 and 52 are inclined downwardly, once the projecting pieces 50 and 52 are engaged with the openings 60 and 62, the projecting pieces 50 and 52 are surely prevented from being disengaged from the openings 60 and 62.

As clearly understood from FIG. 2, the leg portions 26 are engaged and stopped from both the outside and the inside thereof by the projecting pieces 50 and 52, and even if the leg portions 26 move right or left in FIG. 2 inside the insertion openings 44, at least one of the projecting pieces 50 and 52 is deeply engaged with one of the openings 60 and 62, so that the attachment of the leg portions 26 to the case 20 is extremely secured.

In the airbag device structured as described above, when the inflator 30 is actuated to eject the gas, the airbag 22 is inflated, and the lid 24 is torn to open along the thin-walled portion 24a, so that the airbag 22 is deployed in the interior of the vehicle. In this inflation, a force for pushing up toward the upper side in FIGS. 1 and 2 is applied to the lid 24 from the airbag 22, but this force is opposed by the leg portions 26 and the attaching members 28. Since the downwardly inclined projecting pieces 50 and 52 of the attaching members 28 are engaged with the openings 60 and 62, the leg portions 26 are securely held by the attaching members 28.

Although the leg portions 26 at both sides of the lid 24 (left side and right side in FIG. 2) are respectively divided by three sections by two notches 64 in the aforementioned embodiment, the leg portions 26 can be divided into two sections, or the notches 64 can be omitted.

Although the leg portions 26 are only formed in a pair of longitudinally extending sides of the lid 24, the leg portions may be formed in short-length sides of the lid 24. Such leg portions can be connected to the case in the same manner as in the leg portions 26 or by other attaching means.

Figure 4:
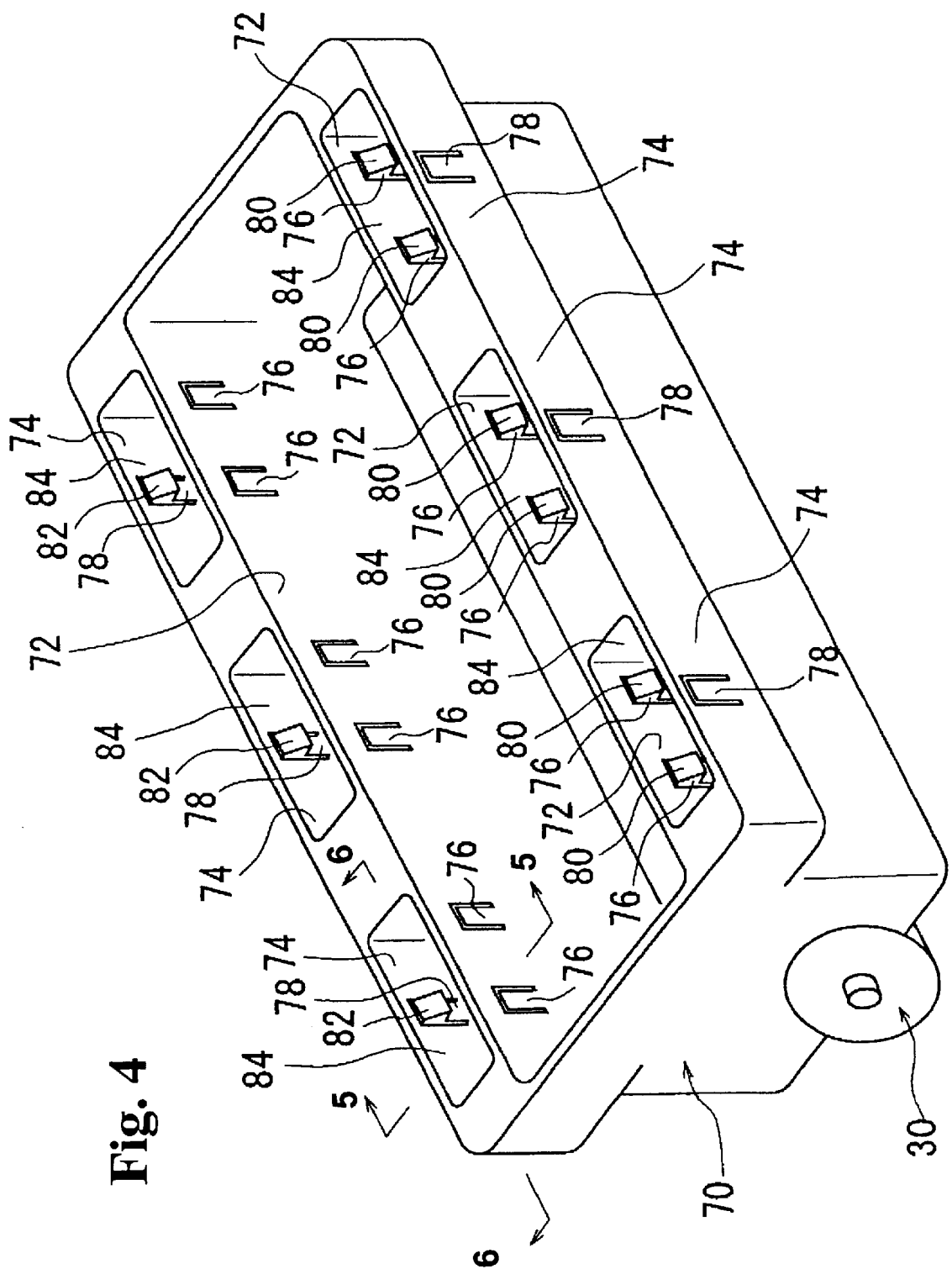
FIG. 4 is a perspective view of a case of an airbag device according to another embodiment of the invention.
Figure 5:
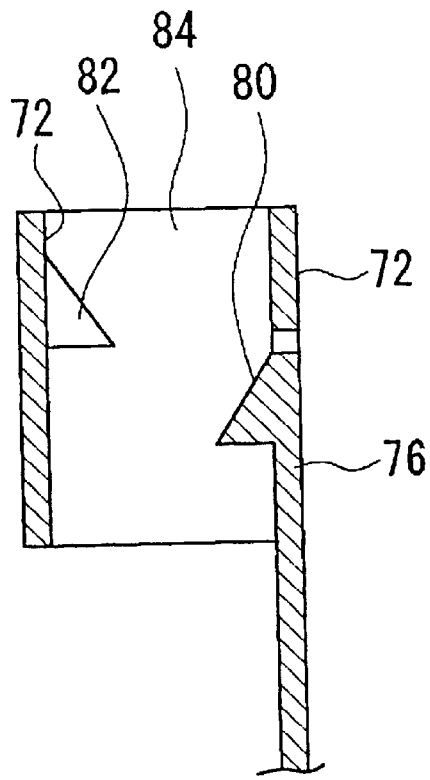
FIG. 5 is a sectional view taken along line 5—5 in FIG. 4.
Figure 6:
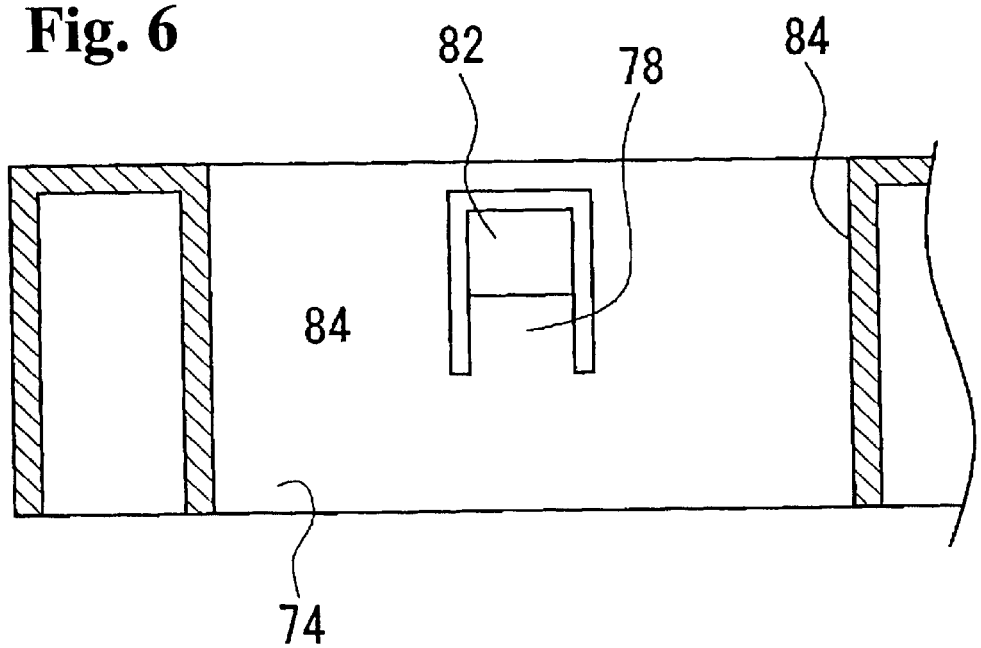
FIG. 6 is a sectional view taken along line 6—6 in FIG. 4.

Hereunder, another embodiment of the invention will be explained with reference to FIGS. 4 through 6. FIG. 4 is a perspective view of a case of an airbag according to another embodiment of the invention; FIG. 5 is a sectional view taken along line 5—5 of FIG. 4; and FIG. 6 is a sectional view taken along line 6—6 of FIG. 4.

A passenger's side airbag device according to this embodiment of the invention also includes a case 70, a shape of which is substantially rectangular in a plan view; an airbag 22 (not shown in FIGS. 4 through 6) folded and disposed inside the case 70; a lid 24 (not shown in FIGS. 4 through 6) for covering an opening at an upper surface side of the case 70; and an inflator 30 having an approximately cylindrical shape for generating a gas for inflating the airbag 22.

In the case 70, an upper rim portion thereof constitutes inner plate-like portions 72, and outer plate-like portions 74 are formed at an outside of the case 70 to face the inner plate-like portions 72. The case 70 including the outer plate-like portions 74 is integrally formed of a synthetic resin or light metal, such as magnesium, magnesium alloy, aluminum, or aluminum alloy. Insertion openings 84 for leg portions 26 (not shown in FIGS. 4 through 6), of the lid are formed between the inner and outer plate-like portions 72 and 74.

Elastic tongue pieces 76 and 78 are formed by forming slits in U shapes in the plate-like portions 72 and 74. Each elastic tongue piece 76 is provided with an inner projection 80, and each elastic tongue piece 78 is provided with an outer projection 82.

The inner projection 80 and the outer projection 82 are respectively inclined toward a rear side (lower side in the figures) of the case 70.

The other structures of the airbag device shown in FIGS. 4 through 6 are the same as in the airbag device shown in FIGS. 1 and 2. Although not shown in the figures, in the leg portions 26, there are formed the first openings 60 with which the inner projections 80 are engaged, and the second openings 62 with which the outer projections 82 are engaged.

In case the airbag device is assembled, in order to attach the lid 24 to the case, it is only required to insert the leg portions 26 into the insertion openings 84 and press the leg portions 26 downwardly. The leg portions 26 are guided by the insertion openings 84 and moved downwardly. In this case, the leg portions 26 hit the outer projections 82 at first, and move downwardly while the elastic tongue pieces 78 are slightly bent. Then, the leg portions 26 hit the inner projections 80, and move while the elastic tongue pieces 76 are slightly bent. When the inner projections 80 face the first openings 60 and the outer projections 82 face the second openings 62, the projections 80 and 82 respectively enter the openings 60 and 62, so that the lid 24 is attached to the case 70. The attachment of the lid 24 is carried out very smoothly, and a weak force is sufficient for pressing the leg portions 26. Also, since the leg portions 26 are guided by the insertion openings 84, positioning of the projections 80 and 82 to the openings 60 and 62 is carried out naturally, and the projections 80 and 82 are easily engaged with the openings 60 and 62. Furthermore, since the projections 80 and 82 are inclined, downwardly, once the projections 80 and 82 are engaged with the openings 60 and 62, the projections 80 and 82 are surely prevented from disengaging from the openings 60 and 62.

In this embodiment, the leg portions 26 are also engaged and stopped from both outside and inside by the projections 80 and 82, and even if the leg portions 26 move to be close to either the plate-like portions 72 or the plate-like portions 74, at least one of the projections 80 and 82 is deeply engaged with one of the openings 60 and 62, so that the attachment of the leg portions 26 to the case 70 is extremely secured.

As described above, in the airbag of the invention, the attachment of the lid to the case is easy, and at the same time, a weight of the attaching member is small, so that it is possible to make the light weight airbag device.

While the invention has been explained with reference to the specific embodiments of the invention, the explanation is illustrative and the invention is limited only by the appended claims.

What is claimed is:

1. An airbag device comprising:
   a case having an opening with a rim,
   an inflator attached to the case for generating a gas,
   an airbag accommodated in the case, said airbag passing through the opening of the case in case of deployment of the airbag,
   a lid for covering the opening of the case,
   leg portions projecting from a rear surface of the lid for fixing the lid, said leg portions having a plurality of first and second openings, and attaching members formed at the rim portion of the opening of the case, each attaching member including at least one inner projecting piece disposed at an inside of the leg portion close to the case and at least one outer projecting piece disposed at an outside of the leg portion away from the case, said at least one inner projecting piece engaging one of the first openings and said at least one outer projecting piece engaging one of the second openings when the leg portions are disposed therebetween.

2. An airbag device according to claim 1, wherein said attaching members are formed separately from the case, and are fixed to the case.

3. An airbag device according to claim 2, wherein each of said attaching members includes a main plate portion fixed to the rim portion of the case, a protruding portion bent from the main plate portion toward an outside of the case and having at least one insertion hole for allowing one of the leg portions to pass therethrough, and a pendent portion bent from the protruding portion toward a bottom of the case.

4. An airbag device according to claim 3, wherein said inner projecting pieces are formed in the main plate portion, and said outer projecting pieces are formed in the pendent portion, said inner and outer projecting pieces being inclined toward the bottom of the case.

5. An airbag device according to claim 4, wherein each of said attaching members is formed on each of two sides of the case facing each other, and includes a plurality of insertion holes for receiving the leg portion, at least one outer projecting piece and at least one inner projecting piece being formed along one insertion hole.

6. An airbag device according to claim 5, wherein each of the leg portions includes a plurality of leg sections, each leg section being inserted into each of the insertion holes.

7. An airbag device according to claim 1, wherein said attaching portions are formed integrally with the case, and include inner plate portions formed at the rim of the case and outer plate portions situated away from the inner plate portions, each of said inner plate portions having said inner projections projecting toward the facing outer plate portion and said outer plate portion having said outer projections projecting toward the facing inner plate portion.

8. An airbag device according to claim 7, wherein said case and attaching portions are integrally formed of one of a synthetic resin and a light metal, said inner plate portion and outer plate portion having U-shaped slits to form elastic tongue pieces, each of said inner projections being formed at the elastic tongue piece in the inner plate portion, each of said outer projection being formed at the elastic tongue piece in the outer plate portion, said inner and outer projections being inclined toward a rear side of the case.

* * * * *